US005176350A

United States Patent [19]

McQuistian

[11] Patent Number: 5,176,350

[45] Date of Patent: Jan. 5, 1993

[54] EQUIPMENT MOUNTING ASSEMBLY FOR RAILROAD CAR COUPLERS

[75] Inventor: Kevin M. McQuistian, Export, Pa.

[73] Assignee: Union Switch & Signal Inc., Pittsburgh, Pa.

[21] Appl. No.: 200,323

[22] Filed: May 31, 1988

[51] Int. Cl.[5] ..... G01L 5/00

[52] U.S. Cl. ..... 248/231.5; 248/316.5

[58] Field of Search ..... 248/231.5, 231.3, 316.5, 248/316.2, 316.3; 24/514

[56] References Cited

U.S. PATENT DOCUMENTS 694,953 3/1902 Evans ..... 24/514
2,543,017 2/1951 Hagan ..... 24/514 X
2,584,955 2/1952 Williams ..... 248/231.34
4,597,205 7/1986 Guest ..... 24/514 X

*Primary Examiner*—Alvin C. Chin-Shue
*Attorney, Agent, or Firm*—Buchanan Ingersoll

[57] ABSTRACT

A mounting arrangement for clamping telemetering monitoring equipment to the core holes of a railroad car coupler including a mechanical assemblage having a pair of fingers which are insertable into the core holes. A tightening mechanism including rotatable threaded rod engages a pivotal gripping block which contacts a web portion between the core holes to draw the outer surfaces of the fingers tightly against the inner surface of the web portion to rigidly hold the assemblage in place.

18 Claims, 4 Drawing Sheets

FIG. 4
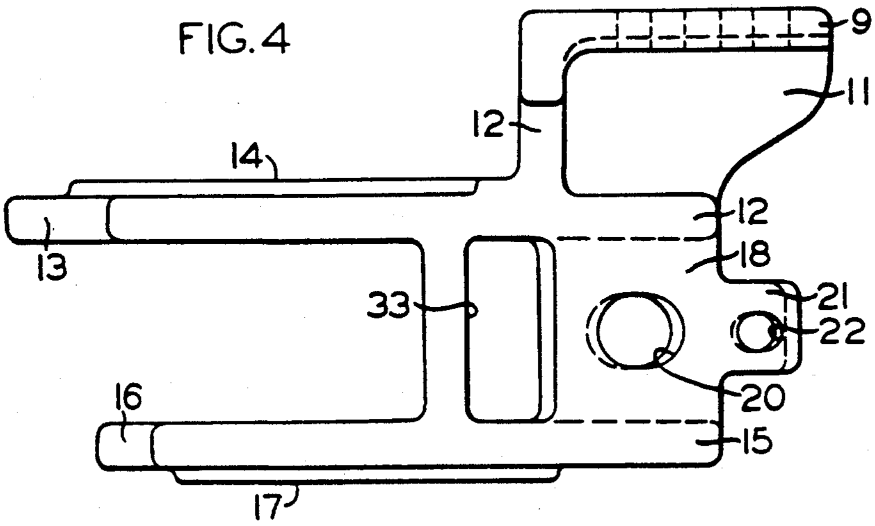
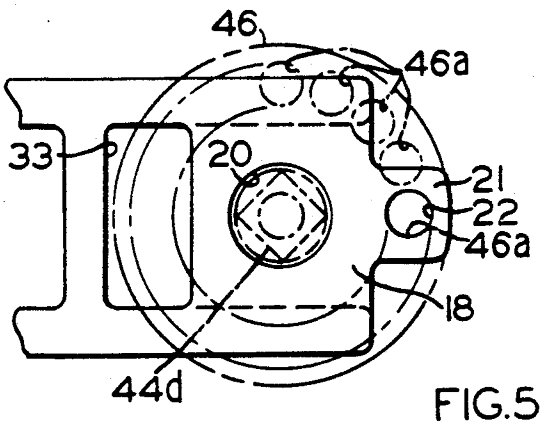
FIG. 5
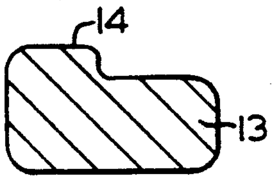
FIG. 6
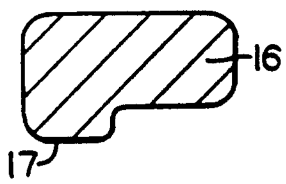
FIG. 7

EQUIPMENT MOUNTING ASSEMBLY FOR RAILROAD CAR COUPLERS

FIELD OF THE INVENTION

This invention relates to a mounting arrangement for securely attaching monitoring and signaling equipment to a railroad car coupler and, more particularly, to a mounting assembly having a clamping attachment including a pair of gripping fingers for being inserted into core holes in a coupler of a railroad vehicle and including a securing mechanism for engaging the exterior surface of the coupler and for drawing the fingers tightly against the interior surface of the core hole as well as having a support platform for carrying end-of-train monitoring equipment.

BACKGROUND OF THE INVENTION

The railroad industry has found that a substantial cost savings can be realized by eliminating the caboose from the end of freight trains. Thus, with the advent of the revenue operations of cabooseless freight trains, there arose the need for some type of telemetry equipment which was capable of sensing and monitoring the brake line pressure and also which is capable of determining the direction of motion and confirming the presence of the last car. In actual practice, the telemetry equipment includes the electronics circuitry, the radio transmitter, the pressure transducer, and the batteries which are all housed within an appropriate protective casing. It has been found that the most practical location for mounting the telemetry equipment is on the coupler of the last railway car since the "glad-hand" of the end of or rear coupling hose is readily available for measuring the brake line pressure. In addition, the last coupler location is obviously the end-of-train, and the body of the last car provides some protection against the elements and environment. However, the shape and bulkiness of the railroad car couplers makes it difficult to suitably mount the end-of-train equipment casing. Further, the equipment is exposed to the extreme shock and vibrations of the railroading milieu. Moreover, the equipment is repeatedly mounted and removed from the railroad cars and, accordingly, it is necessary to provide a method of quickly and easily attaching and detaching the end-of-train apparatus. While previous coupler mounting arrangements, one of which is shown and disclosed in U.S. Patent Application Ser. No. 593,778, filed Mar. 27, 1984, of Blosnick et al, entitled "Clamp for Railroad Car Coupler," have been proposed and used in mounting apparatus to the coupler of the last vehicle of a railroad train, many of these prior art apparatus supporting devices usually had one or more of the following shortcomings. In many cases, they were massive and bulky in size, difficult to mount and remove, unstable in use, expensive to manufacture, complicated in construction, and included an excess number of moving parts which were susceptible to undue wear and subject to ice freezing. In some cases, the coupler mounting arrangement did not permit the coupling of a helper locomotive in pusher operations in mountainous regions or in humping operations in classification yards or the coupling of other freight cars without the need of removing the end of train equipment from the coupler.

OBJECTS OF THE INVENTION

Accordingly, it is an object of this invention to provide a new and improved clamping bracket for mounting telemetry equipment on a railroad car coupler.

Another object of this invention is to provide an improved mounting arrangement for securing end-of-train telemetry apparatus to the end coupler of the last car of a freight train.

A further object of this invention is to provide a novel mounting device having a pair of fingers which fit into core holes of a railroad car coupler and having a movable securing mechanism for tightening the fingers in the core holes.

Yet another object of this invention is to provide a mounting bracket for securely attaching equipment to the last coupler of a railroad vehicle.

Yet another object of this invention is to provide a mounting bracket for securely attaching equipment to the last coupler of a railroad vehicle.

Yet a further object of this invention is to provide an equipment mounting assembly having a plurality of curved fingers which cooperate with a plurality of core holes of a railway coupler and having a pivoted gripping member for tightening the fingers in the core holes to securely hold the equipment to the last vehicle of a train and to withstand the gyrations of the train as it moves along its route of travel.

Still another object of this invention is to provide coupler clamping mounting assembly for securing monitoring apparatus to a railroad car coupler including a plurality of insertable core hole members, a screw member cooperatively associated with a movable member for tightening the insertable core hole members and including a support portion upon which the monitoring apparatus is secured.

Still a further object of this invention is to provide a mounting arrangement for holding equipment onto a railway car coupler including first means for carrying the equipment, second means insertable into core holes formed in the car coupler, and third means for tightening the second means for secure attachment to the car coupler.

SUMMARY OF THE INVENTION

Briefly, in accordance with the present invention, there is provided a mounting arrangement for securing end-of-train monitoring and telemetering equipment to the car coupler of the last railway vehicle. The mounting arrangement includes a bracket means and a clamping means. The bracket means carries and supports the monitoring and telemetering equipment. The clamping means having a pair of elongated fingers insertable into core holes formed in a head portion of a railway car coupler and having tightening mechanism which includes a movable member for engaging the outer exterior surface between the core holes and which includes a threaded rod for causing said movable member to draw said elongated fingers against inner and outer surfaces of the core holes for securely attaching the clamping means onto the railway car coupler.

In accordance with 49 C.F.R., section 239.12 defines,

End of train device (a) An end of train device shall be comprised of a rear-of-train unit (rear unit) located on the last car of a train and a front-of-train (front unit) unit located in the cab of the locomotive controlling the train.

(b) Rear unit: The rear unit shall be capable of determining the rear car brake pipe pressure and transmitting that information to the front unit for display to the locomotive engineer. The rear unit shall be—

(1) capable of measuring the rear car brake pipe pressure with an accuracy of ±3 psig and brake pipe pressure variations of ±1 psig;

(2) equipped with a 'bleeder valve' that permits the release of any air under pressure from the rear of train unit or the associated air hoses prior to detaching the rear unit from the brake pipe;

(3) designed so that an internal failure will not cause an undesired emergency brake application;

(4) equipped with either an air gauge or a means of visually displaying the rear unit's brake pipe pressure measurement; and (5) equipped with a pressure relief safety valve to prevent explosion from a high pressure air leak inside the rear unit.

(c) Reporting rate: Multiple data transmissions from the rear unit shall occur immediately after a variation in the rear car brake pipe pressure of ±2 psig and at intervals of not greater than 70 seconds when the rear car brake pipe pressure variation over the 70-second interval is less than ±2 psig.

(d) Operating environment: The rear unit shall be designed to meet the performance requirements of paragraphs (b) and (c) of this section under the following environmental conditions:

(1) At temperatures from −40° C. to 60° C.;

(2) At a relative humidity of 95% noncondensing at 50° C.;

(3) At altitudes of zero to 12,000 feet mean sea level;

(4) During vertical and lateral vibrations of 1 to 15 Hz., with 0.5 g. peak to peak, and 15 to 500 Hz., with 5 g. peak to peak;

(5) During the longitudinal vibrations of 1 to 15 Hz., with 3 g. peak to peak, and 15 to 500 Hz., with 5 g. peak to peak; and (6) During a shock of 10 g. peak for 0.1 second in any axis.

(e) Unique code: Each rear unit shall have a unique and permanent identification code that is transmitted along with the pressure message to the front-of-train unit. A code obtained from the Association of American Railroads, 50 F Street, NW, Washington, DC 20036 shall be deemed to be a unique code for purposes of this section. A unique code also may be obtained from the Office of Safety Enforcement (RRS-10), Federal Railroad Administration, Washington, DC 20590.

(f) Front unit:

(1) The front unit shall be designed to receive data messages from the rear unit and shall be capable of displaying the rear car brake pipe pressure in not more than one-pound increments.

(2) The display shall be clearly visible and legible in daylight and darkness from the engineer's normal operating position.

(3) The front device shall have a means for entry of the unique identification code of the rear unit being used. The front unit shall be designed so that it will display a message only from the rear unit with the same code as entered into the front unit.

(4) The front unit shall be designed to meet the requirements of 232.19(d) (2), (3), (4), and (5). It shall also be designed to meet the performance requirements in this paragraph—

(i) At temperatures from 0° C. to 60° C.;

(ii) During a vertical or lateral shock of 2 g. peak for 0.1 second; and (iii) During a longitudinal shock of 5 g. peak for 0.1 second.

(g) Radio equipment:

(1) The radio transmitter in the rear unit and the radio receiver in the front unit shall comply with the applicable regulatory requirements of the FCC and use of a transmission format acceptable to the FCC.

(2) If power is supplied by one or more batteries, the operating life shall be a minimum of 36 hours at 0° C.

(h) Inspection:

(1) Upon installation of an end-of-train device, it shall be determined that the identification code entered into the front unit is identical to the unique identification code on the rear-of-train unit.

(2) The functional capability of the device shall be determined at the point of installation, after charging the train, by comparing the quantitative value displayed on the front unit with the quantitative value displayed on the rear unit or on an air gauge. The end device may not be used if the difference between the two readings exceeds three pounds.

(3) The rear unit shall be calibrated for accuracy at least every 92 days. A tag, sticker, or other method of information storage that provides the date of the last calibration, the location where the calibration was made, and the name of the person doing the calibration shall be affixed to the rear unit."

DESCRIPTION OF THE DRAWINGS

The above objects and other attendant features and advantages will be more readily appreciated as the present invention becomes better understood by reference to the following detailed description when considered in conjunction with the accompanying drawings, wherein:

FIG. 4 is a front elevational view of the insertable finger member without the telemetry unit and the tightening member.

FIG. 5 is partial end view of the finger member taken substantially along lines V—V of FIG. 3.

FIG. 6 is a cross-sectional view of the upper finger taken along lines VI—VI of FIG. 2.

FIG. 7 is a cross-sectional view of the lower finger taken along lines VII—VII of FIG. 3.

DETAILED DESCRIPTION OF THE INVENTION

Figure 1:
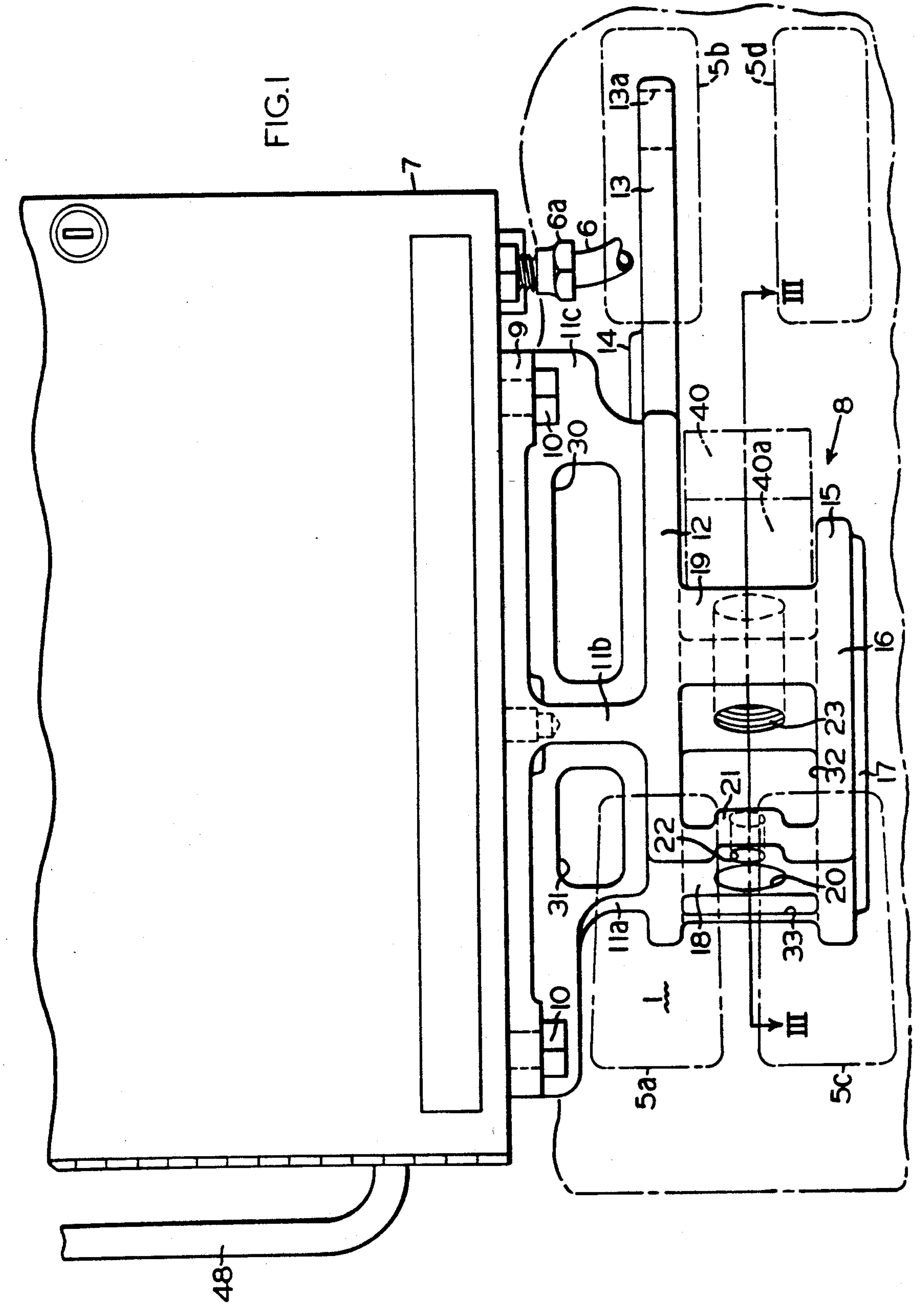
FIG. 1 is a side elevational view of the end-of-train brake pressure monitoring and telemetry equipment support by clamping device which is attached to the side core holes of the AAR coupler head of the last vehicle of a railway train.

Referring now to the drawings, and in particular to FIG. 1, there is shown a mounting arrangement generally characterized by numeral 1 for securely attaching the end-of-train telemetry and monitoring equipment to the end coupler 2 of the last car of a railroad freight train. As shown, the car coupler 2 includes a head portion 3 and a movable knuckle (not shown). It will be noted that the head portion 3 includes a vertical side web face 5 in which are formed weight lessening core or relief holes 5a, 5b, 5c, and 5d. The weight reducing core holes are formed during the casting of the couplers. In practice, the present mounting assembly is designed to accommodate types "E," "F," "SE," "SF," and "E/F" AAR car couplers which are most commonly used in the railroad industry.

The end-of-train telemetering and monitoring equipment includes lockable protective enclosure 7 which houses the necessary electronic logic, radio transmitter, pressure transducer, batteries and other required components. A flexible hose 6 including a threaded fitting 6a is connected to the bottom of the housing to supply brake pipe pressure from the "glad hand" coupler of the last vehicle of the railroad train.

Figure 2:
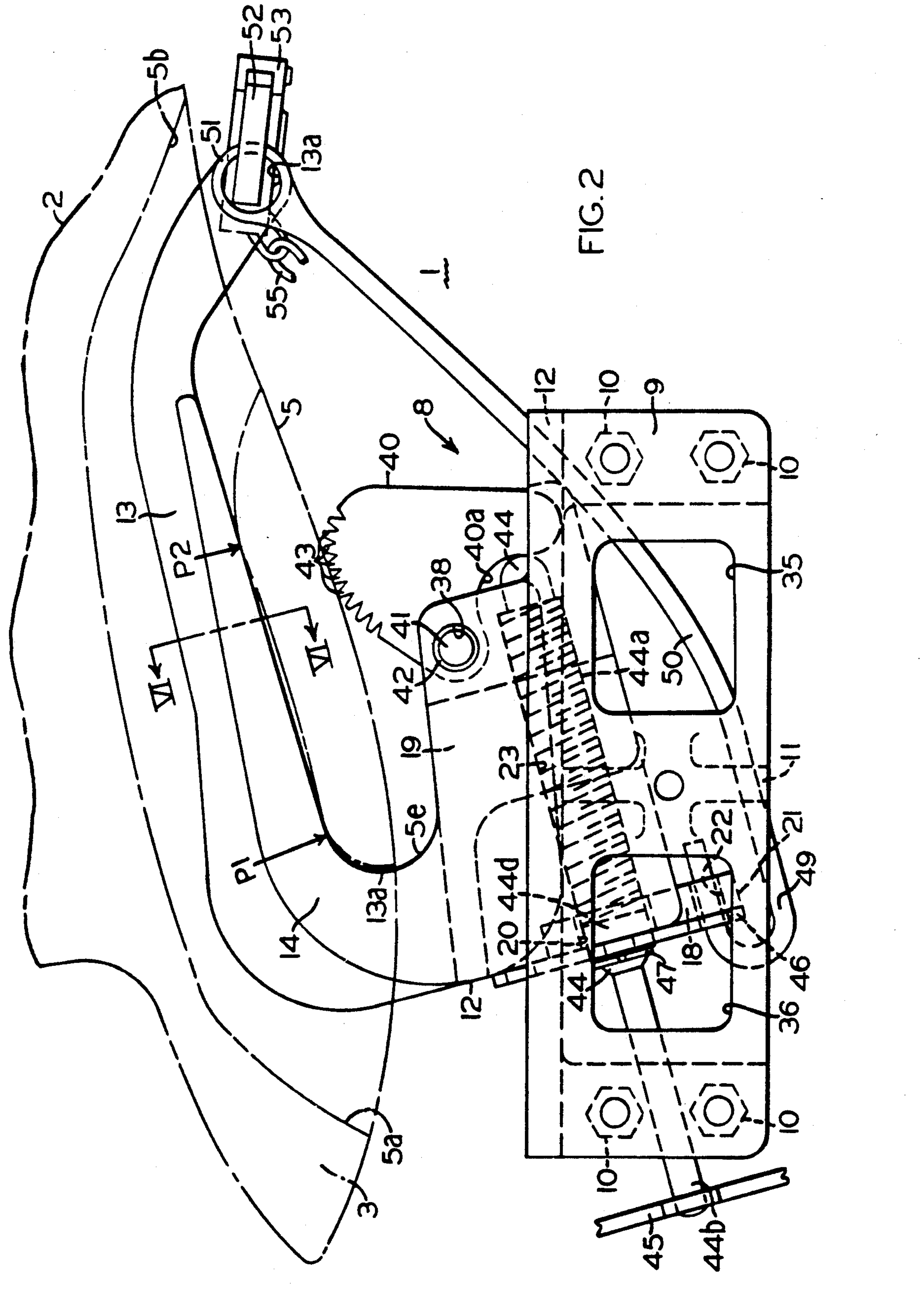
FIG. 2 is a plan view showing the details of the clamping device of FIG. 1 with the monitoring and telemetry unit removed.

As shown in FIG. 1, the weatherproof housing 7 is placed on and carried by an upper platform or support member 9 of a core hole mounting assembly generally characterized by numeral 8. In viewing FIGS. 1 and 2, it will be seen that the underside of the equipment housing is bolted by threaded fasteners 10 located in each of the four (4) corners of the bottom of the rectangularly-shaped member 7. The mounting assembly 8 may be a fabricated structure in which the platform 9 is welded to the top side of upstanding or vertical walls 11a, 11b, and 11c located at right angles to each other. It will be noted that the bottom side of each of the perpendicular walls 11a, 11b and 11c is welded to the upper face of an upper plate member 12 having an elongated primary locking or gripping finger 13 which is adapted to extend from core hole 5a to core hole 5b as shown in FIGS. 1 and 2. It will be seen that an integral reinforcing rib 14 is formed on the upper side of finger 13, and that a circular hole 13a is formed on the remote end of finger 13 adjacent the core hole 5b. A lower plate member 15 including a lower stabilizing and gripping finger 16 is located below the upper gripping finger 13. The lower finger 16 is reinforced by an elongated integral rib portion 17 formed on the underside thereof. As shown in FIG. 1, the upper elongated gripping finger 13 and the lower gripping finger 16 are spatially attached together by an outer wall 18 and an inner wall 19. That is, the upper ends of the walls 18 and 19 are welded to the under surface of the upper finger 13 while the lower ends of walls 18 and 19 are welded to the upper surface of the lower finger 16.

In viewing FIGS. 1, 2, 3, 4, and 5, it will be seen that the outer upstanding wall 18 is provided with a clearance hole 20 which will be described in more detail hereinafter. The outer wall is provided with a tab portion 21 which is provided with a locking or latching aperture, the purpose of which will be described hereinafter. It will be seen, from FIGS. 1, 2, and 3, that the upstanding inner wall includes a threaded hole 23 which is in alignment with clearance hole 20 and will be described presently. It will be observed that the mounting assembly 8 is a fabricated metal structure which has a plurality of relief holes 31, 32, 33, 34, 35, and 36 for lessening the overall weight. In viewing FIGS. 2 and 3, it will be noted that the right-hand portion of upper and lower plate members 12 and 15 includes a pair of aligned holes 38 and 39, respectively. In viewing FIG. 2, it will be seen that a pivotal dog member or arcuately gripping block 40 is rotatable about a pin 41 mounted in holes 38, 39 and which is secured at each end by a split retaining ring 42. As shown, the dog gripping block includes a toothed face or serrated surface 43 which enhances and improves the frictional gripping action. The tooth block 40 is pivoted about the pin 41 by a threaded shaft or bolt-like member 44. The threaded portion of bolt 44 screws into the threaded hole 23, but the diameter of the bolt 44 is such that it freely clears the clearance hole 20. The bolt 44 includes an unthreaded portion 44b to the end of which is secured a suitable handle 45. The other end of bolt 44 includes a rounded portion 44c which is arranged to engage the curved surface 40a of the pivotal gripping block 40. It will be seen that the bolt 44 includes an intermediate portion 44c having square cross-section for accommodating a perforated locking plate 46. Thus, the locking plate 46 may slide a limited amount in the axial longitudinal direction along the square cross-section portion 44d of the bolt 44 as the handle is manually turned but is prevented from rotating relative to the bolt 44. A split retaining ring 47 holds the locking plate in 46 place.

Let us now assume that it is now desired to mount the end-of-train signaling and monitoring unit to the last vehicle of a train. Prior to mounting the unit, a railroad individual or brakeman loosens the gripping block 40 by turning the handle and bolt in a counterclockwise direction which permits the gripping block to be pivoted in a clockwise direction. After the gripping block is opened, the installer may grab the unit by the handle 48 and then he guides the finger 13 into the core hole 5a and the finger 16 into the core hole 5c. The fingers 13 and 16 are further inserted into the core holes until the curved portions 13a and 16a contact the forward edge 5e of the web portion between the core holes of the coupler 2. Now with the fingers fully inserted in the core holes, the mounting assembly may be tightened by turning the handle 45 in a clockwise direction to cause the bolt 44 to move to the right as viewed in FIG. 1. This causes the rounded end 44c to push on the curved surface 40a so that the gripping block 40 is rotated in a counterclockwise direction. Thus, the teeth 43 are forced in contact with and against the exterior surface of the web 5 of coupler 2 in the area adjacent reference numeral 43 of FIG. 2. Thus, when the threaded shaft 44 is properly tightened. the outer edges of the fingers 13 and 16 firmly grip at the points of contact shown by vectors $P_1$, $P_2$ and $P_3$, $P_4$, respectively, and rigidly engage the interior surface of the web portion 5. When the mounting assembly is finally tightened, one of the peripheral holes 46a formed in the locking plate 46 will become aligned with the congruous hole 22 formed in the flange 21 of front wall 18, as shown in FIGS. 2 and 5. Now the free end of a hook portion 49 of a case hardened stainless steel latching rod 5 is inserted into the aligned holes 22 and 46a. It will be seen that the other end of the latching rod 50 is provided with an eyelet 51 which is aligned with the aperture 13a so that a shackle 52 of a padlock 53 passes through the eyelet 51 and hole 13a to prevent unwarranted removal by unauthorized personnel and/or vandals. The size of the padlock is such that it will not pass through core hole 5b thereby ensuring that the end-of-train unit will not fall off, even if the mounting assembly is inadvertently or accidentally loosened.

Figure 3:
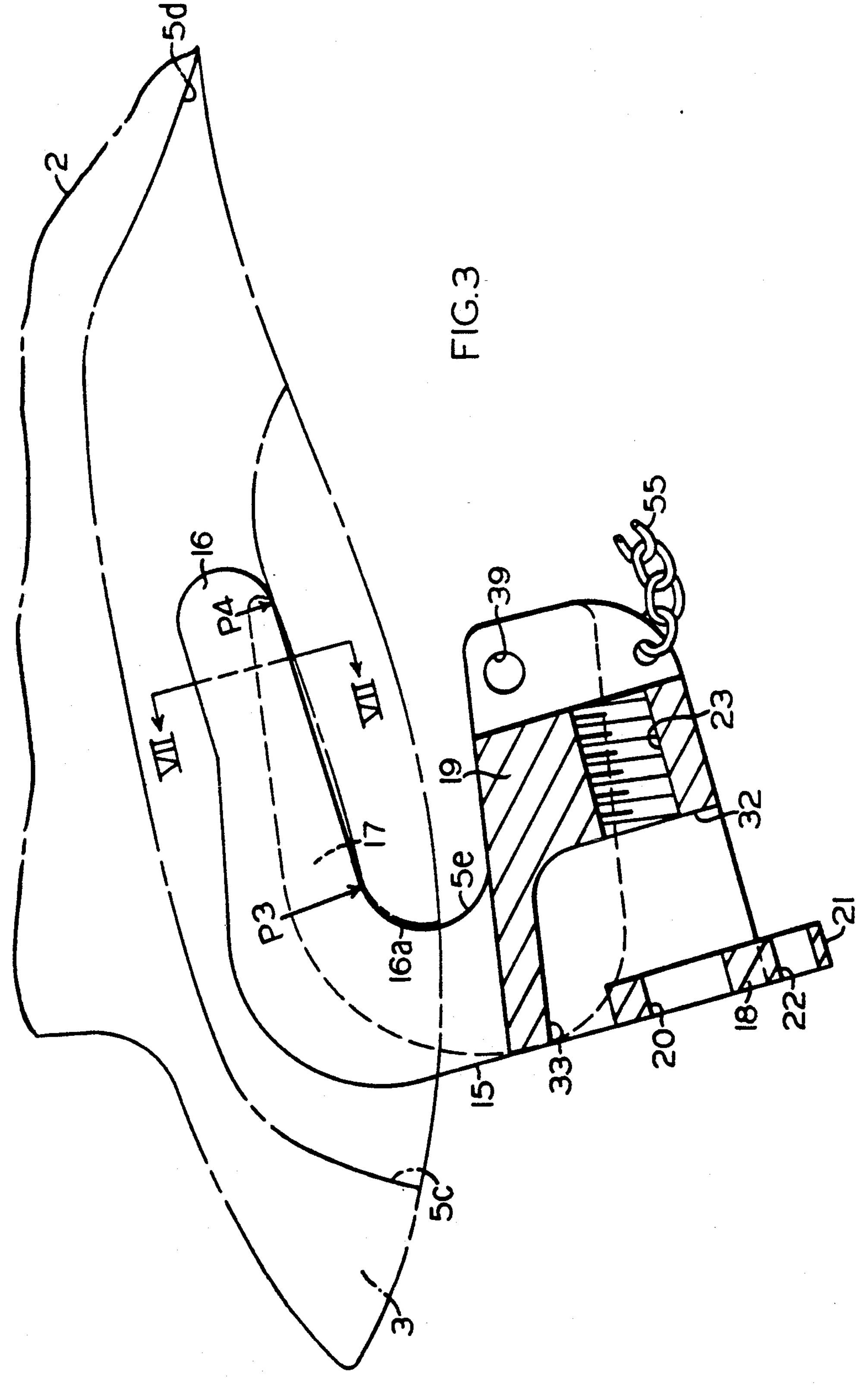
FIG. 3 is a partial top plan view of the clamping device taken along lines II—II of FIG. 1.

In viewing FIGS. 1 and 3, it will be seen that a security or retaining chain 55 is attached to the padlock 53 and to the lower plate member 15 of the mounting assembly 1. Finally, the flexible airhose 6 may be connected to the "glad hand coupler of the last vehicle of the train for measuring and monitoring the brake pipe pressure. Thus, the mounting assembly 1 provides a strong, stable and facile mechanical structure for effectively securing the end-of-train unit to the core holes of a railroad car coupler and permits the unimpeded coupling and uncoupling of pusher locomotives and other railroad vehicles without the need of removing the end-of-train unit.

It will be appreciated that the unit may be readily removed from a railroad car simply by reversing the mounting steps.

Thus, the present invention has been described in such full, clear, concise and exact terms as to enable any person skilled in the art to which it pertains to make and use the same, and having set forth the best mode contemplated of carrying out this invention. It is understood that the subject matter, which I regard as being my invention, is particularly pointed out and distinctly set forth in what is claimed. It will be understood that variations, modifications, equivalents and substitutions for components of the above specifically-described embodiment of the invention may be made by those skilled in the art without departing from the spirit and scope of the invention as set forth in the appended claims.

I claim:

1. A mounting assembly for use to secure equipment to a railroad car coupler, such coupler having a head portion with a pair of core holes extending lateral along one side of said head portion and separated by a web portion, said mounting assembly comprising:

- a bracket means for supporting monitoring and telemetering equipment;
- a clamp means for attaching said bracket means to said coupling;
- said clamp means having a pair of elongated finger means for insertion into said core holes;
- said clamping means having a tightening mechanism which includes a movable member for engaging the outer surface of said web portion between said core holes; and
- said clamping means including a threaded rod means for causing said movable member to draw said finger means in a direction generally perpendicular to the axis of said core holes and forcibly grip against the inner surface of said web portion.

2. The mounting assembly as defined in claim 1, wherein one of said pair of elongated fingers extends completely through the core holes.

3. The mounting assembly as defined in claim 2, wherein said one of said elongated fingers has an apertured portion for accepting the shackle of a padlock.

4. The mounting assembly as defined in claim 2, wherein the other of said pair of elongated fingers terminates within the core holes and engages the inner surface of said web portion beyond the center line thereof to ensure a positive interlock to the coupler.

5. The mounting assembly as defined in claim 1, wherein said movable member includes a serrated surface for contacting the exterior surface of the coupler.

6. The mounting assembly as defined in claim 1, wherein said movable member is pivoted about a vertical axis.

7. The mounting assembly as defined in claim 1, wherein said movable member includes concave and convex surfaces.

8. The mounting assembly as defined in claim 7, wherein said convex surface of said movable member is serrated.

9. The mounting assembly as defined in claim 7, said concave surface of said movable member is engaged by the tip of said threaded rod to permit rotation of said movable member.

10. The mounting assembly as defined in claim 1, wherein said bracket means takes the form of a pedestal member upon which the telemetering equipment is secured to in an upright manner.

11. The mounting assembly as defined in claim 1, wherein one of said pair of elongated fingers engages the inner surface of said web portion of the core holes beyond the vertical center line thereof for preventing loss of the equipment.

12. The mounting assembly as defined in claim 1, wherein said threaded rod has a handle on the free end thereof for manually turning said threaded rod.

13. A mounting assembly for use to secure equipment to a railroad car coupler, such coupler having a head portion with a pair of core holes extending laterally along one side of said head portion and separated by a web portion, said mounting assembly comprising:

- a bracket means for supporting monitoring and telemetering equipment;
- a clamp means for attaching said bracket means to said coupling;
- said clamp means having an elongated pair of finger means for insertion into said core holes;
- said clamp means having a tightening mechanism which includes a movable member for engaging the outer surface of said web portion between said core holes;
- said clamp means including a threaded rod means for causing said movable member to draw said finger means in a direction generally perpendicular to the axis of said core holes and forcibly grip against the inner surfaces of said web portion;
- said bracket means including a pedestal member upon which the telemetering equipment is secured in an upright manner; and
- said pedestal member including an inner upstanding wall and an outer upstanding wall which are interconnected to said pair of elongated fingers.

14. The mounting assembly as defined in claim 13, wherein said inner wall includes a tapped hole for receiving said threaded rod.

15. The mounting assembly as defined in claim 12, wherein said outer wall includes a clearance hole for accommodating said threaded rod.

16. The mounting assembly as defined in claim 13, wherein a superstructure including a platform is integrally formed above said walls.

17. The mounting assembly as defined in claim 15, wherein said superstructure is provided with a plurality of relief holes for reducing the weight of the mounting assembly.

18. The mounting assembly as defined in claim 15, wherein said platform includes a plurality of tapped holes for accommodating a plurality of threaded mounting bolts.

* * * * *

UNITED STATES PATENT AND TRADEMARK OFFICE

CERTIFICATE OF CORRECTION

PATENT NO. : 5,176,350

DATED : January 5, 1993

INVENTOR(S) : KEVIN M. McQUISTIAN

It is certified that error appears in the above-identified patent and that said Letters Patent is hereby corrected as shown below:

Column 1, line 35, delete the second occurrance of "of".

Column 6, line 25, after "direction" insert --as viewed from the top in Figure 2.--

Signed and Sealed this

Sixteenth Day of November, 1993

*Attest:*

BRUCE LEHMAN

*Attesting Officer*

*Commissioner of Patents and Trademarks*